(12) United States Patent
Khurana et al.

(10) Patent No.: US 6,825,978 B2
(45) Date of Patent: Nov. 30, 2004

(54) HIGH SENSITIVITY THERMAL RADIATION DETECTION WITH AN EMISSION MICROSCOPE WITH ROOM TEMPERATURE OPTICS

(75) Inventors: Neeraj Khurana, Monte Sereno, CA (US); Prasad Sabbineni, Fremont, CA (US); Andrew Sabersky, Chico, CA (US)

(73) Assignee: Hypervision, Inc., Fremont, CA (US)

( * ) Notice: Subject to any disclaimer, the term of this patent is extended or adjusted under 35 U.S.C. 154(b) by 99 days.

(21) Appl. No.: 10/397,914

(22) Filed: Mar. 25, 2003

(65) Prior Publication Data

US 2003/0218800 A1 Nov. 27, 2003

Related U.S. Application Data

(60) Provisional application No. 60/370,128, filed on Apr. 4, 2002.

(51) Int. Cl.[7] .................. G02B 21/00; G02B 21/02; G02B 9/00; G02F 1/01
(52) U.S. Cl. .................. 359/368; 359/288; 359/656; 359/661; 359/738
(58) Field of Search .................. 359/368, 288, 359/656, 661, 738; 250/332

(56) References Cited

U.S. PATENT DOCUMENTS

| | | |
|---|---|---|
| 3,905,675 A | 9/1975 | McCracken |
| 4,008,371 A | 2/1977 | Barron |
| 4,349,843 A | 9/1982 | Laakmann et al. |
| 4,714,960 A | 12/1987 | Laakmann |
| 4,827,130 A * | 5/1989 | Reno .................. 250/332 |
| 6,133,569 A | 10/2000 | Shoda et al. |

* cited by examiner

*Primary Examiner*—Loha Ben
*Assistant Examiner*—Jack Dinh
(74) *Attorney, Agent, or Firm*—Beyer Weaver & Thomas, LLP

(57) ABSTRACT

A light emission microscope includes a low temperature detector array which receives light through a room temperature projection optics system from a device under test. A cold aperture including a movable cold stop and a cryogenic filter absorbs unwanted thermal radiation emitted by the optics system. In one embodiment, a high resolution CCD camera can be used with the low temperature detector array and camera with a computer-controlled mirror providing emitted light to both cameras.

19 Claims, 4 Drawing Sheets

HIGH SENSITIVITY THERMAL RADIATION DETECTION WITH AN EMISSION MICROSCOPE WITH ROOM TEMPERATURE OPTICS

CROSS-REFERENCES TO RELATED APPLICATIONS

This application claims priority from co-pending provisional application Ser. no. 60/370,128, filed Apr. 4, 2002, which is incorporated herein for all purposes.

BACKGROUND OF THE INVENTION

This invention relates generally to light emission microscopics as used in semiconductor device testing.

Defects in Semiconductor chips exhibit a LED effect and emit cold radiation with a wavelength of 0.4 μm to 1.3 μm. Traditionally Emission Microscopes have detected radiation emitted from semiconductor chips in the wavelength regime of 0.4 μm to 1.1 μm, and have been used for finding defects in semiconductors.

BRIEF SUMMARY OF THE INVENTION

This invention is directed to extending the range of detection of Emission Microscopes to the 2.2 μm range. By detecting longer wavelengths the Emission Microscope becomes capable of detecting heat emitted from semiconductor chips. This obviously requires using detectors which are sensitive to wavelengths up to 2.2 μm, and using lenses which will operate in that regime. However the Emission Microscope also becomes sensitive to the parasitic thermal radiation emitted within the Microscope and other optical components, and these parasitic thermal signals dramatically degrade the sensitivity of the system. Infrared Microscope Systems exist which try to overcome the problem by one of two ways. First cooling the optical components reduces the parasitic thermal radiation which impinges on the detector. Alternately heating the chip makes it emits more thermal radiation, which overcomes the parasitic thermal signal emitted within the optics. In either case the chip temperatures detected will be significantly higher than the temperature of the optical components. Cooling the optics is messy because it leads to moisture condensation and frost formation on the optical components, and thus all the cooled components have to placed inside a hermetically sealed vacuum chamber. This severely constrains the kind of optical components which can be used and limit the useability of the system. Heating the semiconductor chip is inconvenient and slows down the analysis, because a special fixture has to be built to heat each type of chip. Heating the chip can also alter the characteristics of the chip or the defect and should be avoided.

This invention deals primarily with microscope design techniques which reduce the parasitic thermal radiation which will impinge upon the thermal detector element, and allows the construction of a microscope can detect thermal radiation emitted from chips at room temperature, without having to cool most of the optical components. This allows practically any complex optical configurations to be used, and significantly improves the quality of the analysis which can be performed.

DETAILED DESCRIPTION OF THE INVENTION

Figure 1:
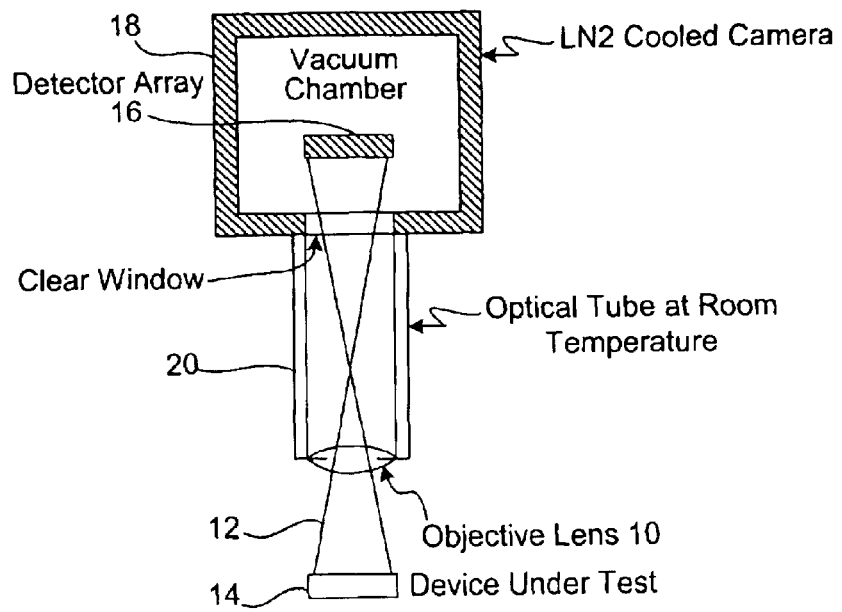
FIG. 1 is a schematic of an emission microscope.

Consider now the simplest microscope system with a microscope objective lens, a plain optics tube and a cooled array detector shown in FIG. 1, where the Objective Lens 10 projects the radiation 12 emitted by the Device Under Test 14 on the Detector Array. In such a configuration the thermal radiation from walls 18 of the optics tube 20 will also impinge upon the detector array, and will degrade the sensitivity of the heat which can be detected from the Device Under Test (DUT) chip.

Figure 2:
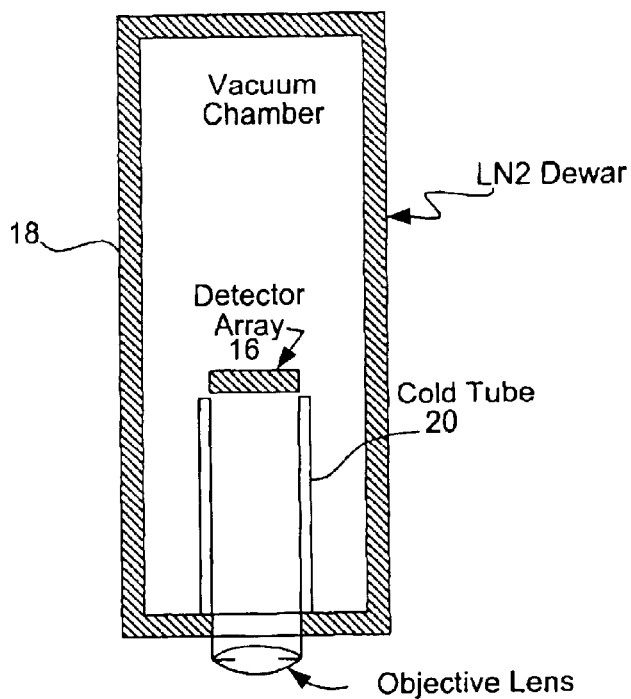
FIG. 2 illustrates an emission microscope with optics tube enclosed inside a cold chamber.

FIG. 2. shows a configuration where the same optics tube 20 in enclosed inside the cold chamber which contains the detector array. If the walls of the tube are 100° C. below room temperature, the thermal radiation emitted from the walls will be insignificant. To view the chip at varying magnifications requires the objective lens to be changed frequently. Consequently a transparent window is used, and the lens is outside the vacuum chamber in front of the transparent window, and the size of the transparent window is slightly larger than the largest lens needed. However there is still some parasitic thermal radiation emitted by the lens which is at room temperature, and this parasitic radiation will impinge on the detector and limit the sensitivity. One source of heat is the stop or the aperture diaphragm of the lens (which is used to limit the axial cone of energy collected by the lens). In addition, a fair amount of heat is emitted from the back of casing of the microscope lens and its mechanical mounting. This configuration cannot have a through the lens illumination scheme since it is not practical to add an illuminator inside the cold chamber. Consequently the systems have to resort to external off axis illumination systems which give poorer image quality.

Conventional Emission Microscopes (non thermal) use a MacroLens configuration to view semiconductor chips at low magnifications. The MacroLens configuration consists of two large back to back camera lenses, and provides a High numerical aperture (>0.2) even at low magnifications. In contrast classical Microscope lenses have very low Numerical aperture (0.05) at low magnification lenses. In the non thermal Emission Microscope switching between the MacroLens configuration and the Microscope lens, requires a motorized slide to move the Macrolens assembly in, and moves out the Microscope Optics assembly. This is very difficult to implement inside a hermetically sealed vacuum chamber. If large Macrolenses are used, the transparent window opening needs to be enlarged, which lets in lots of parasitic thermal radiation when the system is in the microscope mode. Thus the size of macrolens will be constrained by the size of the microscope lens, limiting the numerical aperture of the macrolens to a small number. Typically the microscope lenses are 30 mm in diameter, and the large macrolenses can be 60 mm or greater in diameter. Thus to accommodate a large 60 mm macrolens would require a 60 mm diameter transparent opening, which means that a lot of parasitic thermal radiation would be admitted when used in a microscope mode.

Figure 3:
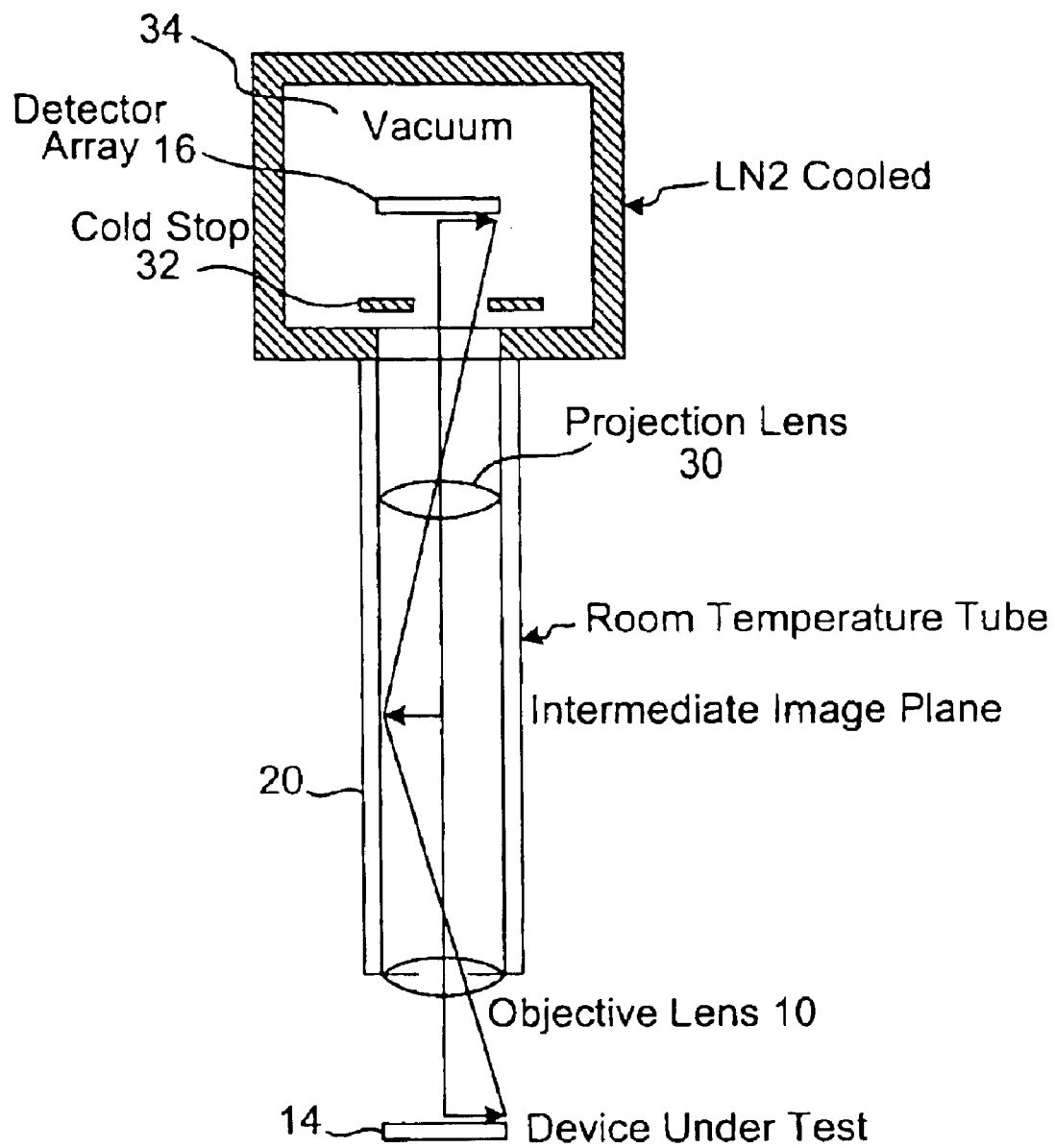
FIG. 3 illustrates an embodiment of an emission microscope having room temperature optics.

Our invention avoids all the constraints of the cooled microscope system. As shown in FIG. 3, a room temperature optical microscope system is used to project an Intermediate image of the device under test 14. Then a Projection Lens system 30 images this Intermediate image onto the low temperature detector array 16. Between the Projection Lens and the array is interposed a Cold Stop 32 which is a thin disc with a small circular opening which acts as an aperture diaphragm. This Cold Stop is below room temperature, and is typically made of sand blasted anodized aluminum. In the preferred embodiment of the invention the Cold Stop is located inside the vacuum 34 of the cooled camera assembly. If the Cold Stop is significantly below room temperature it will absorb 90–95 percent of all incident thermal radiation which lands on the opaque portion. We use it to absorb the unwanted parasitic thermal radiation. If the Cold Stop is located at a certain specific location it will absorb practically all parasitic thermal radiation emitted by the walls of the optics, by the aperture diaphragm and the casing of the objective lens, and the only radiation which passes the opening in the Cold Stop and lands on the detector array, is the radiation emitted by the Device Under Test.

The location of this cold stop 32 is critical. The cold stop is to be located at the plane where the projection lens forms an image of the aperture of the objective lens. At this location the behavior of the cold stop is ideal. If the cold stop is located away from this location the results degrade significantly. Specifically the image will be severely vignetted i.e., the image intensity falls away from the center of the image. The reason is that a lot of radiation from the device under test will be absorbed on the Cold Stop, particularly from the edges of the device. The sensitivity of the system will suffer.

In a normal microscope or camera based system the limiting aperture of the system will be the aperture of the Objective Lens 10. However we are making our cold stop aperture the limiting aperture. The size of the aperture in the cold stop is critical. The aperture should preferably be the limiting aperture of the system, i.e., it should be same size as the aperture of the objective lens, or slightly smaller. In this case only the radiation emitted by the device under test will impinge upon the detector. The diaphragm of the objective line will be projected on the surface of the cold stop around the aperture of the cold stop, and all its radiation will be absorbed by the cold stop. The radiation from the walls 20 of the microscope will be focused at locations in front of the cold stop, and the cold stop will absorb most of this radiation.

In a system, the apertures needed for the MacroLens and the Microscope Lens are very different. The aperture for the Microscope Lenses corresponds to a f16 aperture. However the aperture for the MacroLens corresponds to a f2 aperture. We have used a rotating wheel to mount multiple apertures within the cold camera chamber.

It must be noted that an Intermediate Image and a Projection Lens System is essential for the invention to work properly. For example merely adding a Cold Stop to the system of FIG. 1 does not work satisfactorily. The image formed will be severely vignetted because the signals emitted away from the center of the chip will be absorbed by the Cold Stop. The signal reaching the edge of the array falls off dramatically. Some but not all of the radiation emitted from the warm walls of the optics will be absorbed. Thus without a Projection Lens the performance is degraded dramatically.

Once the Cold Stop is implemented between the Projection Lens and the image sensing array, most of the performance constraints of the warm optics go away. The Warm Macrolens configuration now becomes practical and a large numerical aperture of the large camera lenses poses no performance compromises. Similarly having a through the lens illumination scheme now becomes practical, since with cold optics it was not practical to put an illuminator inside the hermetically sealed cooled chamber.

Figure 4:
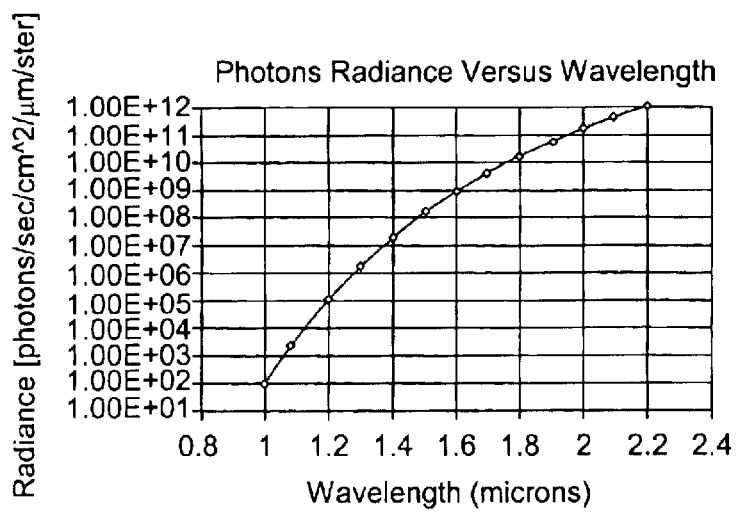
FIG. 4 is a plot of thermal flux versus wavelength.

We find that it is also desirable to use short wavelengths of the thermal radiation spectrum. Traditionally thermal imaging and heat detection have used long wavelengths 3–7 $\mu$m. The reason is that the thermal radiation increases exponentially with long wavelengths. See FIG. 4. Thus it is easier to build systems with long wavelengths. However the spatial resolution of system is limited by the well known limit R=wavelength/N.A, where –N.A is the numerical aperture of the optical system.

Figure 5:
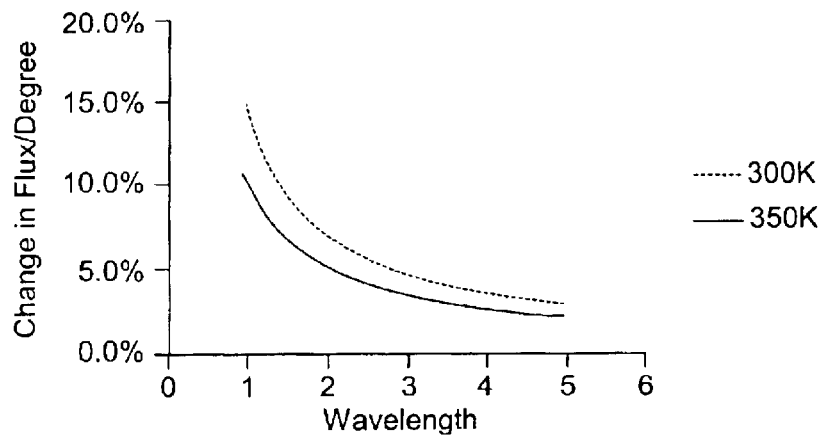
FIG. 5 illustrates image contrast versus wavelength.
Figure 6:
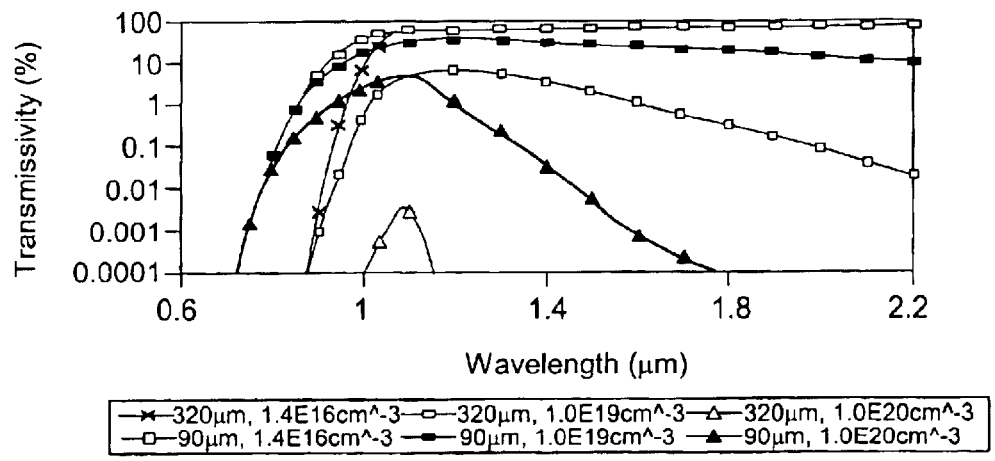
FIG. 6 is a plot of siticon light transmission versus wavelength and doping.

Thus using long wavelengths clearly degrades the resolution of the system, and with the rapid decreases in the size of the features on a chip, there is a greater need to reduce the resolution of the microscope and use shorter wavelengths. Further more the Thermal Contrast (Change in Thermal Flux per degree C), also improves at shorter wavelengths, see FIG. 5. Another reason for using shorter wavelengths is the need to see heat from the backside of silicon chips. Today chips have several layers of metal surface on the front of to chip, and the outgoing thermal radiation is trapped by the layers of metal. This problem can be solved if the chip is viewed from the backside, since silicon is transparent at wavelengths above 1.1 $\mu$m. However at long wavelengths Silicon begins to absorb the thermal radiation emitted, as shown in FIG. 6, and the emission of parasitic heat from Silicon begins to increase. Thus at long wavelengths the thermal signal produced by a defect is attenuated, while the parasitic thermal signal from silicon increases. Thus it is desirable to use as short a wavelength as is practical.

Figure 7:
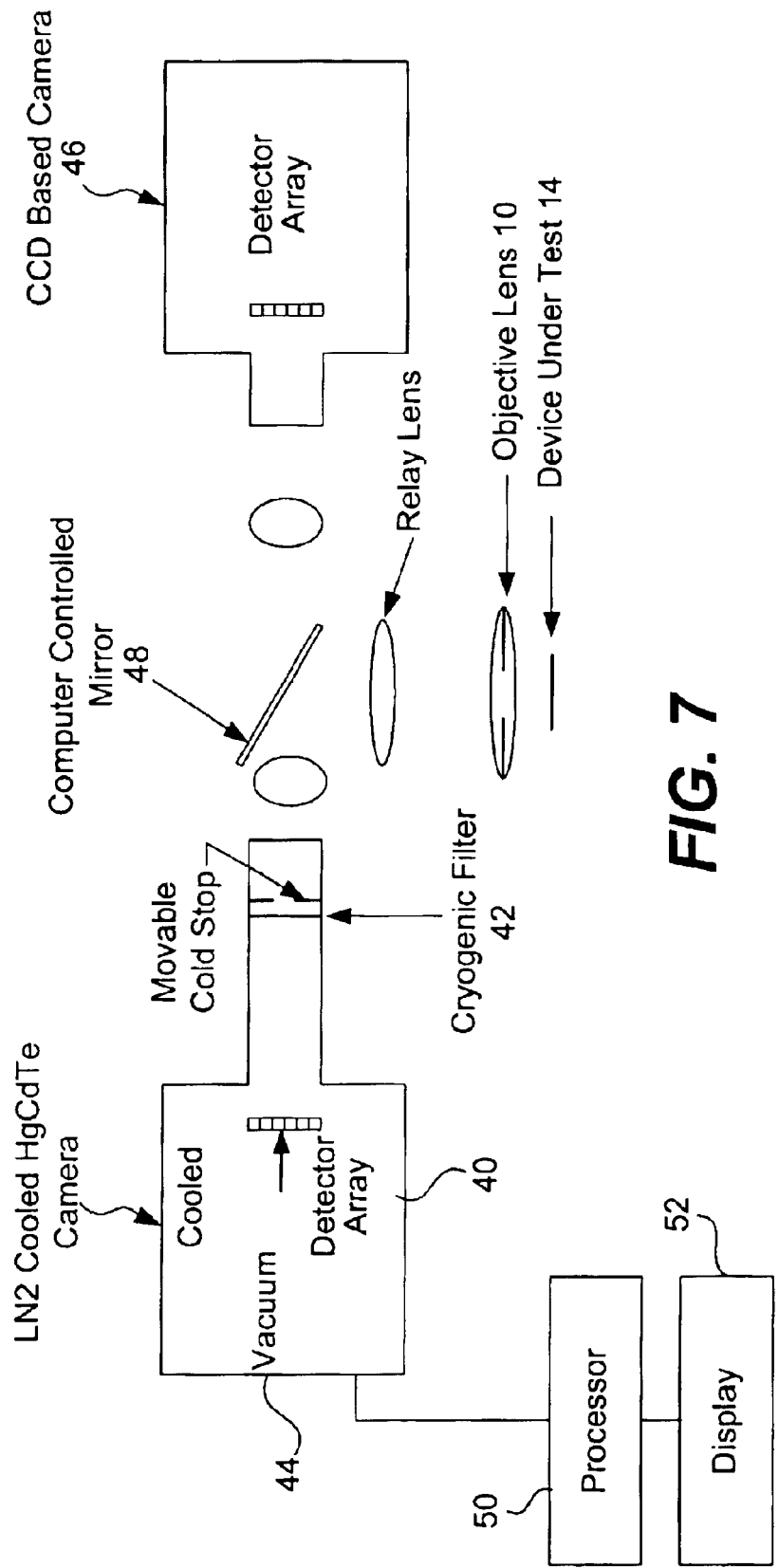
FIG. 7 illustrates a combination cooled light emission camera and a high resolution CCD camera.

The use of a filter which block long wavelengths is desirable. The innovations in noise reduction and signal detection described earlier significantly improve sensitivity. This has allowed us to use shorter wavelengths than has been customary. As shown in FIG. 7, we use a MERCAD (HgCdTe) array 40 as a sensor which is sensitive from to radiation from 0.8 $\mu$m to 2.6 $\mu$m, and we have used cold filters 42 to block out unwanted wavelengths from impinging on the array. Our experience shows that low thermal flux situations (e.g. chip defects at a few degrees above room temperature) are best detected by using a filter which blocks radiation above 2.2 $\mu$m. However when the chip is hotter, and there is more thermal flux we get better thermal contrast and temperature resolution by blocking out thermal radiation above 1.8 $\mu$m. However, the filters at room temperature emit heat, and so consequently the filters also have to be cooled, and are located within the cooled hermetically sealed camera chamber 44. The chip when powered up can also emit cold recombination radiation from 0.4 $\mu$m to 1.4 $\mu$m. We find that to properly discriminate a thermal defect from a cold emission site we have to block the short wavelengths (<1.5 $\mu$m). Thus we use three filter types 1.6–2.2 $\mu$m band pass filter for low flux thermal defects, 1.6 $\mu$m–1.8 $\mu$m band pass filter for high flux thermal defects, and 1.5 $\mu$m low pass filter for cold emission defects. The filters are mounted on a rotating circular wheel. In the first embodiment of our invention a common wheel mounts the cold filters and the different apertures, but in subsequent implementations we plan on using a separate aperture wheel and a filter wheel.

In addition to forming a thermal image there is also a need to form a high resolution reflected light image (illuminated image) of the chip. The need for the high resolution reflected image with CCD camera 46 is to help reference the thermal image with the features on the chip surface. This is done by computer superimposition of the thermal image with the reflected light image. The resolution of the reflected light image needs to be maximized. This is accomplished by using as short a wavelength as possible for forming the reflected light image. The HgCdTe array 40 is sensitive from 0.8 μm to 2.5 μm. So we illuminate the chip with a broad band source like standard tungsten filament lamp, and use filters to remove the long wavelengths. Another means of optimizing the quality of the reflected light image is to use through the lens illumination, and not lateral illumination schemes which are standard on infrared thermal imagers. Through the lens illumination is standard on laboratory microscopes, but is not used on thermal imagers and infrared systems. The through the lens illumination is not practical on cooled cameras because of the thermal emissions from the components of the illuminators. We have eliminated the thermal emission from the sidewalls of illuminator by the cold stop inside the camera. Mirror 48 will also reflect the parasitic heat emitted, and to minimize that, we are not using a partially silvered mirror, but a plain glass mirror at present. To minimize the reflection of parasitic heat by the illuminator mirror, the reflectivity of the mirror must be minimized in the 1.8 μm to 2.1 μm regime. Plain glass has a reflectivity of 7 percent, but we are developing special coatings which will reduce the reflectivity in this spectrum.

A HgCdTe Detector Array is made by Rockwell Scientific, and has a 256×256 format, and the array is known commercially as the PICNIC Array. We have also used low signal detection electronics developed by Rockwell Scientific in conjunction with us. The signal from the electronics is fed to a frame grabber which resides inside a Personal Computer 50. We process the image captured by the frame grabber in several ways. Firstly, the image is read out several times and averaged, to minimize the electrical noise. In low flux situations we readout the signal eight times and average it. In high flux situations the multiple readouts are not done. Secondly, different pixels in the detector array have different gains and offsets. We correct for these non uniformities by a process known in the image processing technology as flat fielding. It involves storing the gain and offset parameters inside the computer after the system is manufactured, and applying the necessary mathematical operations.

All processed images acquired are displayed on a monitor 52. On the preferred embodiment of the system the computer monitor serves as the display monitor as well, the processed image is displayed inside a window. All images are also backed up on the hard disk, and the system maintains a disk copy of the eight most recent images.

At this stage we create a map of the thermal flux emitted by the chip. However we first make this map, with the chip powered off, and then repeat it with the chip powered on. The difference of the two images is then taken, which is the extra radiation emitted by the chip due to powering on the chip. This is adequate for hot spots on the chip. This thermal flux map can be superimposed by the computer on the reflected light image, or alternately on the CAD map of the chip. This superimposed image helps locate the hot spots on the chip. This operation is repeated at higher and higher magnification of the objective lens, until the highest magnification image is obtained to help locate the defect. The user will eventually use a Scanning Electron Microscope to view this location at even higher magnification (since the electron microscopes have much higher magnifications), hopefully get a high resolution image of the defect which causing the hot spot. For certain applications it is necessary get a temperature map of the chip instead of a map of the thermal flux. The reason is that the chip consists of different materials which have widely different emissivity. The thermal flux given off by an object is a function of both the temperature and the emissivity of the object. For example, Aluminum has a very low emissivity of 0.05, while Aluminum Oxide has a high emissivity of 0.80. For the same temperature rise, the Aluminum Oxide will emit nineteen times more thermal flux than Aluminum. To develop the temperature map it necessary to do more image processing by calculating the emissivity of every pixel on the chip. This is accomplished by using a computer controlled hot chuck to measure the thermal flux at two different temperatures on every pixel on the chip, and the computer thus calculates the emissivity of every pixel, and this information is used to transform the thermal flux map to the temperature map.

The present HgCdTe array we use is limited to a 256×256 format. Higher size arrays are available but the cost is astronomical. Modern chips demand the highest possible resolution. We achieve this by using a two-camera solution. In addition to HgCdTe array we also use a astronomical grade CCD array 46 made by Kodak which has a resolution of 1317×1035. The high resolution image obtained by the CCD camera 46 can also be used as the Illuminated Image. This is achieved by using a twin optical path configuration with a camera switching capability. The projection lens systems consists of two back to back f2 lenses with a gold mirror in between. The HgCdTe camera and the CCD based Camera share the first element of the projection lens, but have separate elements of the second lens. To switch from one camera to the other requires a movement of the mirror 48 to switch from one position to the other. This is accomplished by a high precision computer controlled motor. The CCD 46 has a spectral response from 0.4 μm to 1.1 μm. So its spectral response complements the response of the HgCdTe array, for recombination emission defects below 0.8 μm. So the CCD sensor can serve to form either the emission image or illuminated image. The system has a software calibration feature which maps the CCD camera space into the Camera Space of the HgCdTe array. This allows us to superimpose the illuminated image taken on the CCD camera with the emission image taken with the HgCdTe. Overall, the dual camera arrangement allows the best of both words of the HgCdTe array and the astronomical grade CCD.

While the invention has been described with reference to specific embodiments, the description is illustrative of the invention. Various changes can be made without departing from the true spirit and scope of the invention as defined by the appended claims.

What is claimed is:

1. A microscope comprising:
    a Low Temperature Detector array which outputs an electronic signal proportional to the thermal radiation above 1.5 μm;
    Multiple Objective Lenses for imaging thermal radiation emitted by a device under test and to project an Intermediate image, different objective lenses having different magnifications;
    a Projection Lens system for imaging the Intermediate image on to the detector array;
    a Cold Aperture which is a limiting aperture of the system, located between the projection lens system and the detector array, the said cold aperture absorbing the unwanted thermal radiation emitted within the optical system, and the cold aperture located at a plane conjugate with the exit stop of the objective lens;

a Cold Optical Filter means which blocks unwanted wavelengths from imaging on the array;

a Processor means coupled to the low temperature detector array for removing noise and enhancing the signal; and a Display means coupled to the processor means for displaying a thermal image of the heat emitted by the device under test.

2. A microscope of claim 1 where the low temperature filter blocks thermal radiation above 2.2 µm.

3. A microscope of claim 1 with a low temperature filter which passes radiation between 1.5 µm and 2.2 µm.

4. A microscope of claim 1 where the low temperature filter block thermal radiation above 1.8 µm.

5. A microscope of claim 1 with a low temperature filter which passes radiation between 1.5 µm and 1.8 µm.

6. A microscope of claim 1 with movable means allowing multiple cold filters.

7. A microscope of claim 6 where the Detector Array is sensitive to non thermal radiation (<1.3 µm).

8. A microscope of claim 7 with through the lens illumination means for short wavelengths (<1.3 µm) allowing high resolution reflected light images, which can be superimposed on the thermal image acquired through the same objective lens.

9. A microscope of claim 1 with movable means allowing multiple cold apertures which are optimized for each objective lens.

10. A microscope of claim 9 in which the Multiple Objective Lenses of claim 1 include a Macro Lens for obtaining a global view of the device with a high numerical aperture (>0.05), as well as Microscope Lenses which provide high magnification for viewing sub areas of the device.

11. A microscope of claim 10 where the macro objective lenses comprises two back to back lenses with a high numerical aperture (>0.1).

12. A microscope of claim 11 with a low temperature filter which block thermal radiation longer than 2.2 µm.

13. A microscope of claim 12 where the low temperature filter passes radiation between 1.5 µm and 2.2 µm.

14. A microscope of claim 11 with a movable low temperature filter which blocks radiation longer than 1.8 µm.

15. A microscope of claim 12 with low temperature filter which passes radiation between 1.5 µm and 1.8 µm.

16. A microscope of claim 10 with movable means allowing multiple cold filters.

17. A microscope of claim 16 where the Detector Array is sensitive to non-thermal radiation (<1.3 µm).

18. A microscope of claim 17 with through the lens illumination means for short wavelengths (<1.3 µm) allowing high resolution reflected light images, which can be superimposed on the thermal image acquired through the same objective lens.

19. A microscope of claim 10 with movable means allowing multiple cold apertures which are optimized for each objective lens.

* * * * *